US007002712B2

United States Patent
Barker et al.

(10) Patent No.: US 7,002,712 B2
(45) Date of Patent: Feb. 21, 2006

(54) SELECTIVE DOCUMENT SCANNING METHOD AND APPARATUS

(75) Inventors: John C. Barker, Houston, TX (US); Montomgery C. McGraw, Spring, TX (US); Derrill L. Sturgeon, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 400 days.

(21) Appl. No.: 10/614,482

(22) Filed: Jul. 7, 2003

(65) Prior Publication Data

US 2004/0004733 A1 Jan. 8, 2004

Related U.S. Application Data

(63) Continuation of application No. 09/253,209, filed on Feb. 19, 1999, now Pat. No. 6,646,765.

(51) Int. Cl.
G06K 15/00 (2006.01)
H04N 1/38 (2006.01)
H04N 1/32 (2006.01)

(52) U.S. Cl. ............... 358/474; 358/468; 358/1.6; 358/1.8

(58) Field of Classification Search ........... 358/474, 358/468, 1.6, 1.8, 452, 448, 453, 470, 401
See application file for complete search history.

(56) References Cited

U.S. PATENT DOCUMENTS

| | | | | |
|---|---|---|---|---|
| 3,751,582 A | * | 8/1973 | Wernikoff et al. | 358/406 |
| 4,352,012 A | | 9/1982 | Verderber et al. | 358/403 |
| 5,051,779 A | * | 9/1991 | Hikawa | 399/84 |
| 5,075,787 A | * | 12/1991 | Shaughnessy et al. | 358/452 |
| 5,126,858 A | | 6/1992 | Kurogane et al. | 358/450 |
| 5,159,635 A | * | 10/1992 | Wang | 380/51 |
| 5,161,037 A | * | 11/1992 | Saito | 358/468 |
| 5,386,298 A | * | 1/1995 | Bronnenberg et al. | 358/403 |
| 5,563,986 A | * | 10/1996 | Suzuki | 358/1.15 |
| 5,630,079 A | | 5/1997 | McLaughlin | 345/734 |
| 5,673,105 A | * | 9/1997 | Brook, III | 355/75 |
| 5,881,214 A | * | 3/1999 | Morisawa et al. | 358/1.18 |
| 6,002,491 A | * | 12/1999 | Li et al. | 358/436 |
| 6,646,765 B1 | * | 11/2003 | Barker et al. | 358/474 |
| 2001/0040685 A1 | * | 11/2001 | Winter et al. | 358/1.6 |
| 2001/0043369 A1 | * | 11/2001 | Melen | 358/468 |
| 2004/0004733 A1 | * | 1/2004 | Barker et al. | 358/1.13 |

* cited by examiner

Primary Examiner—Jerome Grant, II

(57) ABSTRACT

A technique is disclosed for selectively scanning or encoding a desired region of a document. The desired region is identified via scannable indicia on a control form. The region may be outlined by a border preprinted on the form or traced by a user. Preset selectable regions may be identified by codes or other textual descriptions on the form. The form is scanned and the instructions selected by the user are encoded. The selected region is identified and scanned. Only the selected region is scanned, or a larger region is scanned and extraneous data not corresponding to the selected region is eliminated from the resulting data set. The technique permits elimination of unwanted portions of a document automatically, the reduction in scanned file size, and straightforward handling of batch scanning tasks in which selected portions of documents are to be scanned and processed.

23 Claims, 6 Drawing Sheets

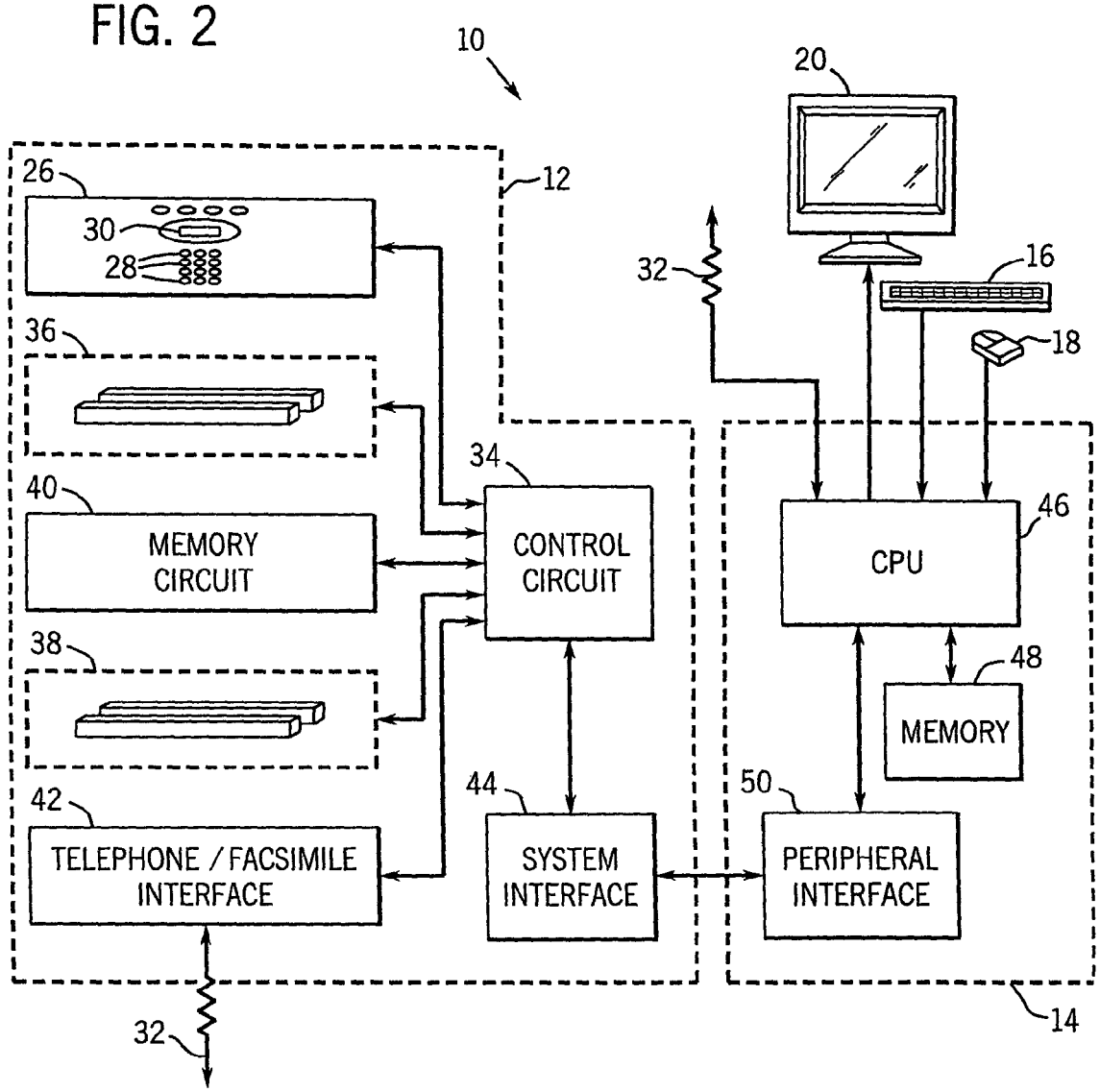

FIG. 3

CONTROL FORM

FAX CONTROL PANEL

FAX CONTROLS

- ☐ COVER PAGE
- ☐ COMPANY LOGO
- ☐ URGENT
- ☐ GREYSCALE MODE

CONFIRMATION REPORT
- ☐ HARDCOPY
- ☐ HARDCOPY /W COVER
- ☐ E-MAIL CONFIRM

ADD FAX NOTE HERE:

FROM:
- ☐ MARK PHISH
- ☐ STEVE JOHNSON
- ☐ LYLE KARNS
- ☐ DON PHAGEL
- ☐ DEMITRI CARLS
- ☐ JENNY PAGEL
- ☐ HERB MALONE
- ☐ CHESTER MURPHY

TO:
- ☐ SARA BATES (NEW YORK)
- ☐ MARK PETAL (SCAN TO E-MAIL)
- ☒ GLEN SAMPRAS
- ☐ NOEL MACKIE
- ☐ PAUL JONES (SAN FRANCISCO)
- ☐ GRETIN MACNAMARA
- ☐ KEN WOLF
- ☐ EVON KLUSKI
- ☐ TED SIMON (MILWAUKEE)
- ☐ ANNE BAKER (FAX)
- ☐ L. M. PARKER
- ☐ LYNN GROVER
- ☐ FRANK HENDERSON
- ☐ JAKE LANE
- ☒ LAURIE MAYNER
- ☐ PAUL WOODWARD (CHICAGO)
- ☐ KAREN LAMER (SCAN TO E-MAIL)
- ☐ CLARK TOMPSON - JONAS CO.
- ☐ JOHN PACKER
- ☐ LEE SUN (DETROIT)

COPY CONTROL PANEL

COPY CONTROLS
- ☐ FAST DRAFT (DEFAULT)
- ☒ GREYSCALE
- ☐ COLOR DRAFT
- ☐ HIGH QUALITY COLOR

NUMBER OF COPIES
- ☐1  ☐6
- ☒2  ☐7
- ☐3  ☐8
- ☐4  ☐9
- ☐5  ☐10

REDUCE ─────── ENLARGE
☐50% ☐67% ☐93% ☐100% ☐150% ☐200%
DEFAULT

SCAN CONTROL PANEL

SCAN QUALITY
- ☐ TEXT OR LINE ART
- ☐ GREYSCALE MODE
- ☐ COLOR DRAFT MODE
- ☐ HIGH QUALITY COLOR
- ☐ FLASHPIX MODE

RESOLUTION
- ☐ 75 DPI
- ☐ 150 DPI
- ☐ 200 DPI
- ☐ 300 DPI

LIGHTER ☐ ☐ ☐ ☐ ☐ ☐ DARKER
DEFAULT

SELECTIVE DOCUMENT SCANNING METHOD AND APPARATUS

CROSS REFERENCE TO RELATED APPLICATION

This application is a continuation of application 09/253,209, now U.S. Pat. No. 6,646,765, filed on Feb. 19, 1999 which is hereby incorporated by reference herein.

BACKGROUND OF THE INVENTION

1. Field Of The Invention

The present invention relates generally to the field of scanners for creating digital representations of documents and the like. More particularly, the invention relates to a technique for selectively scanning desired regions or designated areas of a document. The invention also relates to a technique for automatically identifying desired regions to be scanned which permits the scanner to encode only the desired regions to the exclusion of the remainder of a document or document page.

2. Description of the Related Art

Over the last several years, considerable improvements have been made in document scanning techniques. In general, document scanners illuminate a surface of a document page and detect reflections from the surface. The radiation reflecting from the page surface is encoded digitally to form a string of data or a data set representative of the indicia appearing on the document page surface. Digital scanners of this type generally divide the scanned surface or image into a matrix of discrete picture element or pixel regions. By progressively scanning lines and columns in the matrix, the entire image is encoded. The resulting code or data may be stored and further processed, and the scanned image may be subsequently reconstructed and printed.

Digital scanners are presently employed in a wide variety of components. For example, hand-held scanners permit a user to selectively input or encode a portion of a document page by sliding an array of light emitting diodes and photodiodes, and associated encoding electronics, over a document. Full-page scanners allow documents to be similarly encoded by being placed on a flat glass plate adjacent to which a scanning diode structure moves. Sheet feed scanners allow document pages to be inserted and drawn through a series of rollers to similarly pass the document before a scanning head arrangement. Such scanners may be employed in association with personal computers, but are increasingly employed in facsimile machines, printers, copying machines, and so forth.

In scanners of the type described above, a document surface is generally fully scanned during an encoding sequence. That is, the entire surface of the document page over which the encoding photodiodes extend is detected and a data set representative of pixels in the scanned image is generated. For documents having meaningful information extending over the entire page, such scanning techniques are well suited. However, when many smaller documents are scanned, the resulting data set includes large amounts of data for regions of the image which are not of interest or which contain no useful information. If all of the information contained in the data set is retained, the resulting digital file can become quite large and unnecessarily occupy available memory space and processing time.

Several techniques have been developed to selectively reduce the size of data files of scanned images. In one technique employed in personal computers, for example, generally referred to as the "TWAIN" driver, a low resolution pre-scan operation is performed and the results of the pre-scan operation can be displayed on a computer monitor. A user can then select a limited region of the document page by reference to the pre-scanned image. A subsequent higher resolution scan can then be performed on the selected region. While this technique permits a limited region of the document to be encoded in the final scan, it inconveniences the operator by requiring feedback during the scan. Moreover, the technique is not particularly well suited to automated scanning processes, such as in copiers, facsimile machines, or multifunction scanner or printer systems. The technique is similarly impractical for highly automated office environments in which a wide variety of document scanning is to be performed in batch-type processes.

There is a need, therefore, for an improved technique for selectively scanning regions of documents. There is a particular need for a technique which would permit reduced data set sizes to be output by virtue of the reduction in the size of a scanned region to a size and configuration designated by a user. The technique would advantageously allow users to preselect regions of a document and stack work in a batch-type arrangement for sequential processing.

SUMMARY OF THE INVENTION

The present invention provides a selective document scanning technique designed to respond to these needs. The technique may be employed in a wide variety of systems, including multi-function printers, sheet feed scanners, full page scanners, copying machines, facsimile machines, and so forth. The technique utilizes an instructional or control form which may be included on a separate page from the scanned material, or on the same page. The control form provides instructions which are recognized by the scanner for selecting a region of the document to be scanned. The region may include fixed, predetermined areas of the document page, or may be defined by graphics provided on the same or an overlay sheet, or graphics designed by the user. In accordance with the control form instructions, therefore, the scanner encodes all or only some of the document. The control form may also be provided on or in a document carrier that includes a transparent or translucent overlay sheet. The carrier thus permits small documents such a photographs, clippings, receipts, and the like to be scanned selectively in accordance with the control form instructions set. The instruction set may define a wide array of controllable parameters, depending upon the scanner capabilities.

BRIEF DESCRIPTION OF THE DRAWINGS

The foregoing and other advantages of the invention will become apparent upon reading the following detailed description and upon reference to the drawings in which:

FIG. 2 is a diagrammatical view of certain of the functional components and circuits of the system of FIG. 1, including those of the scanning device and associated computer;

FIG. 3 is a layout of an exemplary instruction input sheet, including both machine and human readable indicia composed and customized by a user for controlling operation of the scanning device and for performing other functions, such as facsimile or electronic message transmission;

DETAILED DESCRIPTION OF SPECIFIC EMBODIMENTS

Figure 1:
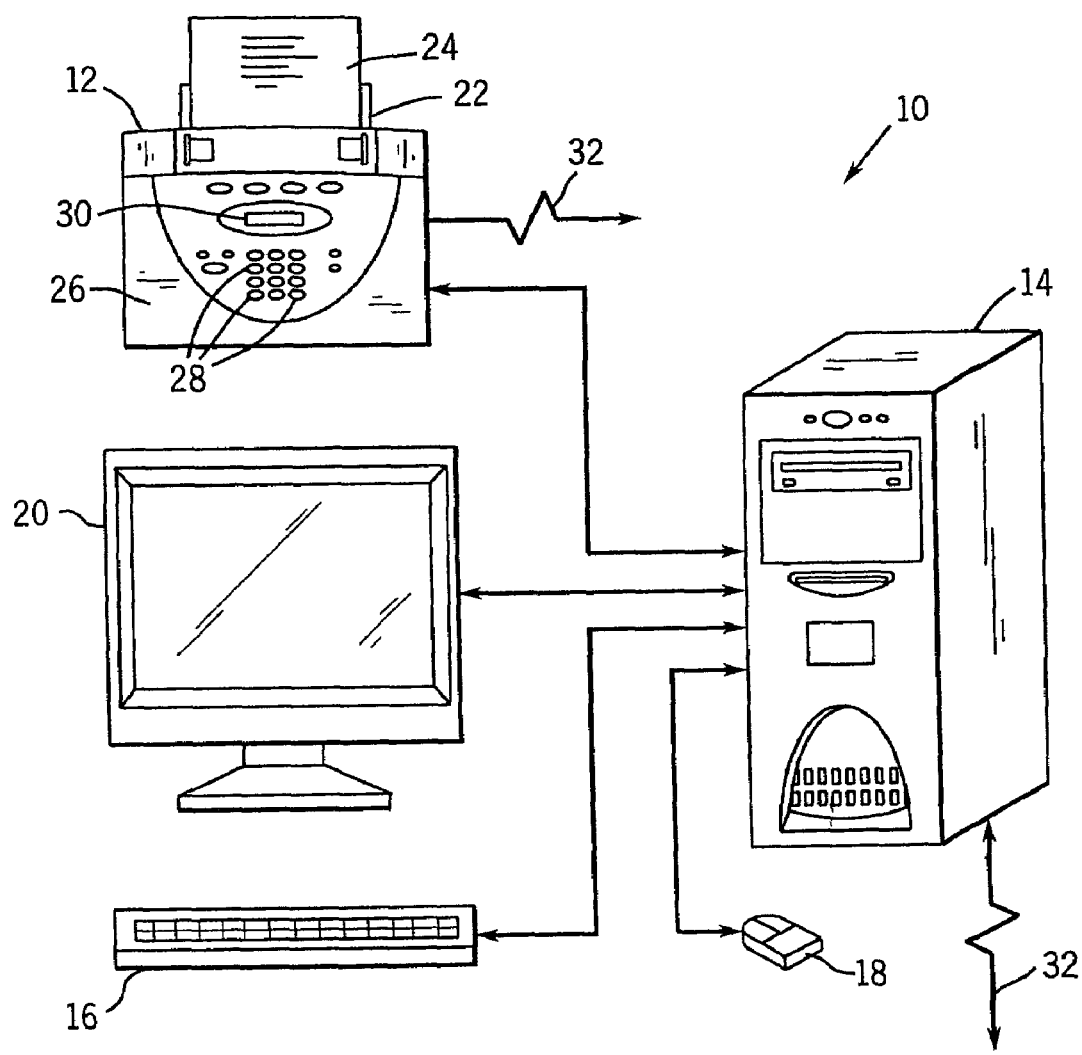
FIG. 1 is a diagrammatical representation of a computer system including a scanning device capable of generating digital data representative of a document.

Referring now to the drawings, and turning first to FIG. 1, a document handling or a computer system 10 is illustrated as including a scanning device 12, a computer 14, a keyboard 16, a mouse 18, and a monitor 20. System 10 is particularly well suited to inputting user-defined data, such as through the keyboard, mouse and monitor, as well as for inputting data by digitizing indicia on a page in the scanning device. In the illustrated embodiment, system 10 includes a stand-alone computer designed to carry out instructions based upon indicia disposed on a document as described more fully below. It should be noted, however, that the system may include a series of networked computers, servers, peripheral devices, and so forth. Also, in the illustrated embodiment described herein, scanning device 12 is linked to computer 14, and serves multiple functions, including scanning or digitizing documents, printing documents, transmission of facsimiles of documents, and so forth. Accordingly, the scanning device may rely on certain of the circuitry and programming embodied within the computer, or may rely solely upon its own stand-alone circuitry. In the latter case, certain of the techniques described herein may be employed on a self-sufficient device, such as a non-networked facsimile machine, multi-function peripheral device, photocopying machine, and the like.

As illustrated in FIG. 1, scanning device 12 is a sheet-feed scanner including a document feed tray 22 in which document 24 can be positioned for scanning. The present techniques may also be employed with hand-held scanners, flatbed scanners, and so forth. Device 12 further includes an interface panel 26 on which a series of input buttons or keys 28 are accessible by a user. Depending upon the particular configuration of the device, such keys may include conventional digit input keys, as well as particular function keys for executing such operations as scanning, copying, facsimile transmission, instruction input, and so forth. A read-out display 30 is provided on interface panel 26 to allow certain textual messages to be displayed for the user. Scanning device 12 may receive and transmit data via a telephone or similar network link 32. In the illustrated embodiment, computer 14 also includes a similar network link 32. Depending upon the system design, a single network link may suffice for the transmission and receipt of data to and from both the scanning device and the computer system.

FIG. 2 illustrates certain of the functional circuitry and components of system 10 in a diagrammatical representation. As summarized above, the system generally includes a computer 14 linked to the scanning device 12. The user input and output devices, such as keyboard 16, mouse 18, and monitor 20, are linked directly to computer 14. While the scanning device 12 may include a wide array of functional circuits and hardware, depending upon its particular design, in the illustrated embodiment the device includes a control circuit 34 which is configured to execute programming code for independently controlling the operation of the various sub-circuits and components of the device. Thus, control circuit 34 is coupled to the input keys and display of interface panel 26 for receiving user-generated commands, and for displaying messages to a user. A scanning head 36 is provided within the device for digitizing indicia on documents fed into the device. As will be appreciated by those skilled in the art, scanning head 36 may be designed for either black-and-white scanning or for color scanning, or both. In general, such devices emit radiation to the surface of a document and detect reflections from the surface, encoding contrasting wavelengths differently to generate digital output data. The data is transmitted from scanning head 36 to control circuit 34 where it is processed as described below. A print head 38 is coupled to control circuit 34 to permit digitized data to be output on a printed page.

Control circuit 34 is also coupled to memory circuit 40. This circuitry will typically include stored data, including programming code executed by control circuit 34 for carrying out the functions described below. Moreover, memory circuit 40 includes operational parameters employed by the device in scanning documents, printing documents, transmitting digitized data, and so forth.

Device 12 further includes interface circuits linked to control circuit 34 for exchanging data with other remote components. Thus, a telephone/facsimile interface circuit 42 is provided for sending and receiving data defining documents in facsimile format. A system interface circuit 44 is also provided for receiving and exchanging data and commands from computer 14.

It should be noted that certain of the functionalities described herein are designed to be carried out on peripheral devices such as a scanning device, including both scanning and printing capabilities. However, certain of the present techniques may be employed on devices having more limited capabilities, including scanning capabilities alone. Similarly, for certain of the techniques described herein, a telephone/facsimile interface circuit may not be required, particularly where scanned data is transmitted to a memory circuit or computer system for archival storage, further processing, transmission through the associated components, and so forth.

In the embodiment illustrated in FIG. 2, computer 14 includes a CPU 46 linked to memory circuitry 48, as well as to a peripheral interface circuit 50. Computer 14 may be of any suitable type, such as a personal computer system, computer work station, laptop computer, and so forth. As will be appreciated by those skilled in the art, in general, CPU 46 executes pre-established programming code, typically in the form of application software. The code is stored in memory circuit 48 which may include hard disk drives, random access memory, dynamic random access memory, and so forth. Peripheral interface circuitry 50 may include hardware, firmware, and software for driving scanning device 12 and for executing specific functions such as transmitting and receiving data representative of both operational instructions or parameters, as well as digitized documents.

In accordance with the present techniques, scanning device 12 can receive instructions for its operation in one of several manners. Firstly, manually input commands can be formulated by depressing keys 28 on interface panel 26. As the keys are depressed, signals are transmitted to control circuit 34 for executing specific functions, typically by reference to code stored within memory circuit 40. Secondly, specific instruction sets can be transmitted to the device from computer 14. Finally, instructions can be input via an instruction support sheet on which machine and human readable indicia are provided. As described more fully below, the instruction support sheet may take various forms, depending upon the nature of the instructions to be provided, the document to be scanned, the operation to be performed during and following scanning, and so forth.

FIG. 3 illustrates an exemplary instruction or control input sheet 52 designed to be scanned and processed by scanning device 12. As shown in FIG. 3, sheet 52 includes a series of blocks or sections including descriptive text indicative of selectable settings or instructions. Adjacent to each instruction is a location which may be marked by the user, and which thereafter becomes an indication to the system that a specific setting or function is to be implemented or executed. In the illustrated embodiment, a form code 54 is provided in an upper region of the sheet and may be used to indicate to the system that the sheet represents instructions to be applied during a scanning or processing operation. In addition, the form code may cause the control circuit 34 to refer to a specific data set, thereby directing the interpretation of instructions contained on the form to various users, systems, and so forth, allowing a shared peripheral device or scanning device to be used for a number of different users who individually configure or customized such forms as described more fully below. In addition to form code 54, the sheet illustrated in FIG. 3 includes a series of facsimile control instructions, which may be referred to as a handling block 56, and a follow up block 58. In the illustrated embodiment these blocks include selections for configuring facsimile cover pages, applying company logos, designating an urgent status, generating confirmation reports in the form of hard copies, bard copies with cover sheets, e-mail confirmations, and so forth. In addition, a message block 60 is provided in which the user may write or type specific messages to be reproduced on a facsimile cover sheet, for example.

Additional blocks are provided in the illustrated embodiment for designating originating authors of documents or transmissions, as indicated at origin block 62, as well as for designating one or more destinations, as indicated at destination block 64. In a present embodiment, sheet 52 may be customized or configured by a user via computer 14, or a remote computer. During configuration of the sheet, data, such as names, addresses, location designations, and so forth, are input into a configuration application which composes instruction input sheet 52. Textual descriptions of the configurations, including the names of common authors or destinations are then laid out on the sheet for selection by the user. As described below, each name is then associated with additional data stored within computer 14 or within memory circuit 40 of scanning device 12 to be accessed when the corresponding selection is made by the user.

In the case of the instruction input sheet 52 of FIG. 3, a series of copy and scan control options are displayed and made available to the user. For example, copy control blocks 66 are provided, including an image quality block 68 and a number of copies block 70. The copy controls block permits the user to select gray scale, color scanning, and other options, while the number of copies block allows the user to select the number of copies to be produced. Scan control blocks 72 may include mode selections 74 and resolution selections 76. Moreover, additional blocks may be provided for such parameters as document reduction or enlargement as indicated at reference numeral 78, and document darkness or contrast control as indicated at reference numeral 80. As will be appreciated by those skilled in the art, a wide variety of additional selectable instruction sets may be encoded on the input sheet. For example, in a present embodiment, the selectable instructions include a collate function in a copy control block. Similarly, scan control functions may include such operations as identification of a destination directory, designation of a preferred format (e.g. BMP, JPG, TIFF, and so forth).

It should be noted that certain of the instructions provided on sheet 52 may be specific to the scanning device or system, while other instructions may be specific to users or organizations. For example, the facsimile control options may be expanded or reduced, depending upon the preferences of the user or organization. Similarly, where the sheet is customized for a single user, the origin block 62 may be reduced or eliminated. Moreover, as will be appreciated by those skilled in the art, in many scanning devices and associated systems, a large number of controllable parameters may be adjustable by control circuit 34 or external circuitry. Thus, the options provided within the copy control, scan control, and other instruction groups may be significantly expanded or reduced, depending upon the flexibility of the scanning device, the capabilities of the system, the desires of the system user, and so forth. In general, however, any control parameters which are available through the code implemented by the scanning device, or by a component associated with the scanning device for subsequent processing of scanned images, may be provided on the instruction sheet. These parameters include any such parameters which are typically input via keystrokes on conventional scanners, copiers, printers, and so forth.

Each textual description of a selectable input on sheet 52 is associated with a reference location which is evaluated by the control circuitry to identify user selections. In the illustrated embodiment, such locations are designated by squares adjacent to each textual description. Upon composition of the sheet, these reference locations are identified and stored in the sheet configuration. This data may be stored either in the scanning device or in a computer memory or other component associated with the scanning device. Moreover, certain data may be encoded directly on the input sheet, such as telephone numbers for facsimile transmissions, and so forth, reducing or eliminating the need for referring to specific data sets preconfigured by the user. In general, the reference locations are used to identify annotations made to the sheet corresponding to specific selections. Thus, upon reading the text, designated generally by reference numeral 84 in FIG. 3, a user may make a mark or define such a mark by typing, selection in an application routine, or in another manner, in a specific reference location on the form. The instruction set defined by the selections is then identified by scanning the form and evaluating the locations of discrete picture elements or pixels corresponding to the reference locations.

In a present embodiment, certain of the locations may be identified as default settings, as indicated by reference numeral 86 in FIG. 3. Such default settings may be called out to the user by textual descriptions, or maybe lightly colored, crossed or otherwise marked. Marks 88 made by the user on the form then indicate desired selections which may be used to override the default settings. Moreover, as described more fully below, when the digitized data is processed, certain of the selections may be mutually exclusive, while others may permit multiple selections. This is particularly the case of such settings as resolution, scan quality, number of copies, and so forth. Examples of allowable multiple selections might include facsimile controls such as cover page generation, urgent status, as well as multiple addressees, and so forth.

The reference locations corresponding to the selections of the instructions on sheet 52 may be identified in several manners. In a present embodiment, reference is made to known or identifiable reference or register points at anticipated locations on the instruction input sheet. In the case of the sheet of FIG. 3, a reference point 90 may be identified in an upper corner of the form and a second point 92 in a lower corner. The specific location of specific selections may then be identified by scaling the digitized sheet between the known reference locations. In this manner, variations in scanner feed rates, resolutions, orientations, and the like may be accommodated while maintaining an acceptable degree of accuracy in evaluation of the encoded instructions.

The instruction input sheet or similar instruction sets may be defined in any of a variety of configurations and associated with documents in various manners. For example, the instructions input sheet 52 of FIG. 3 is particularly well suited to processing batch document handling tasks in scanning, copying and similar devices. As used herein, the term "document" should be understood to include indicia or markings that are scanned and acted upon generally. Such documents may be provided on the same or different sheets or pages from the instructional indicia, and may or may not include human readable characters. Moreover, the term "indicia" is intended to relate generally to any marking or contrasting characters or regions that are detectable by the scanning device.

Figure 4:
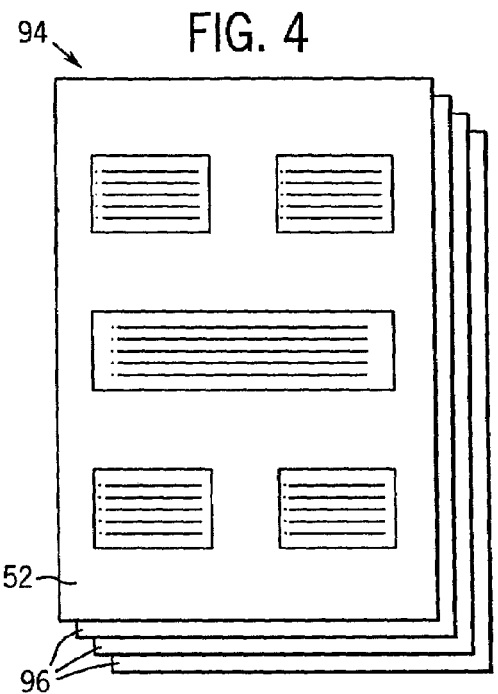
FIG. 4 is an illustration of a batch process file, including an instruction sheet of the type shown in FIG. 3 and a series of document pages disposed after the instruction sheet in the batch.

FIG. 4 illustrates the manner in which the instruction input sheet would be employed in such batch processing. As shown in FIG. 4, once composed and annotated with desired selections marked, the sheet becomes a cover document for a batch job as indicated by reference numeral 94. One or more subsequent document pages 96 are positioned behind the input sheet. When processed, the instruction input sheet is digitized first, the particular desired instructions are encoded, accessed and loaded, and the subsequent pages of the batch are then digitized and processed. Thus, the instruction input sheet may serve as a cover sheet for a facsimile transmission batch job, for example, in which the sheet defines the manner in which the document is to be scanned, scaled, and so forth, as well as the origin and destination of the data transmission. Similarly, the sheet may serve to direct the system to encode and transmit electronic messages including the document as an attachment or insert. Moreover, where an annotated message is employed on the sheet, such as in a message block 60 (see FIG. 3), a cover page may be composed by the scanning device or by an associated computer, including reproduction of the message contained in the block.

In other presently contemplated embodiments, certain instructions of the type described above may be encoded on a specific area or designated region of a document support.

Figure 5:
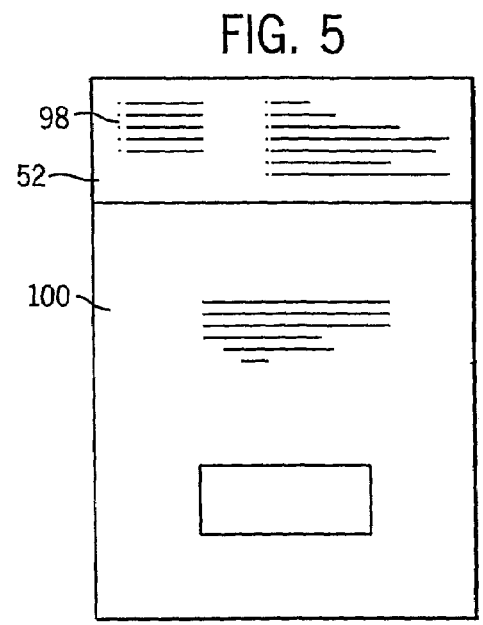
FIG. 5 is an exemplary illustration of an alternative configuration for a document support including an instruction set and a document support region.

As illustrated in FIG. 5, for example, sheet 52 may include a designated instruction area 98 in which preset or user-configurable instruction selections are defined in human readable text associated with reference points as described above. A document area 100 is provided adjacent to the instruction area for supporting text, images, and so forth. As before, when the document support is scanned, instructions encoded in the instruction area are referenced and used to define parameters for scanning, processing, transmitting and performing other operations on the digitized data corresponding to the information in the document area 100.

Figure 6:
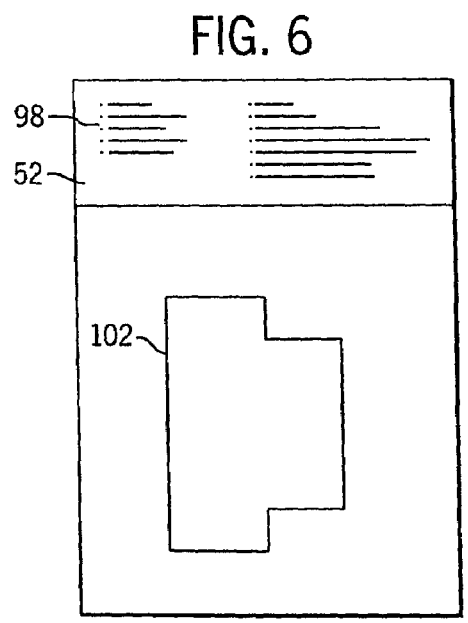
FIG. 6 is a further alternative configuration of a document support, including a designated scanning area and an instruction set.

FIG. 6 shows a further alternative configuration similar to that of FIG. 5 but wherein a specific document is applied to the document area. Thus, document 102 may comprise supports, such as paper, on which articles, photographs, receipts, and so forth are positioned.

Figure 7:
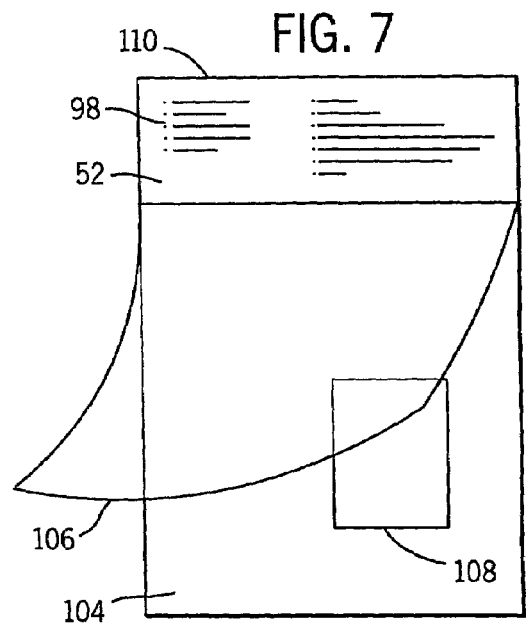
FIG. 7 is a further alternative configuration of a document support, including a base and an overlay sheet.

A further alternative configuration for a document support including an instruction set is illustrated in FIG. 7. The instruction input sheet 52 of this embodiment includes a document support base 104 over which a transparent overlay sheet 106 is positioned. As before, an upper region of the support carries specific user-selectable instructions within an instruction area 98. A document 108 may be positioned on the base 104 and the overlay sheet laid down over the document. The overlay sheet may be conveniently secured to the base at an upper edge 110. When the document is positioned on the support, the entire instruction input sheet 52 may then be scanned and the user selected instructions employed for scanning and processing the document supported below the overlay. As described more fully below, certain of the instructions provided on the overlay sheet may identify specific regions of the support corresponding to the location of the document. This feature of the present technique permits specific selection of a spatial region for scanning. Thus, where smaller documents, such as photographs, receipts, notes, and so forth, are to be encoded, stored, transmitted or otherwise processed, the entire support area in which document 108 is positioned, need not be scanned. Alternatively, when the entire area is scanned, only data corresponding to the selected region may be stored in memory or transmitted from the system.

Figure 8:
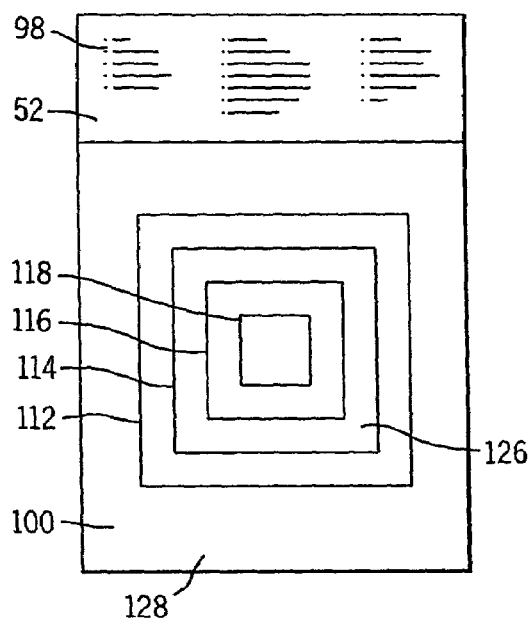
FIG. 8 is an exemplary document support, including a series of spatial regions which can be selectively scanned in accordance with instructions on the support.
Figure 9:
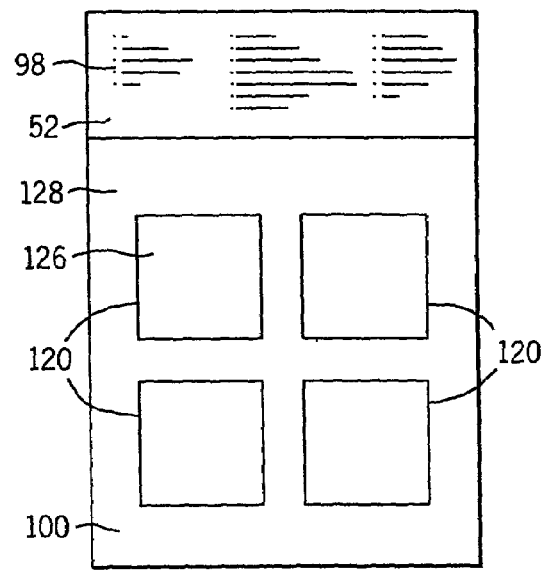
FIG. 9 is an alternative configuration of a document support, including separate selectable spatial regions.
Figure 10:
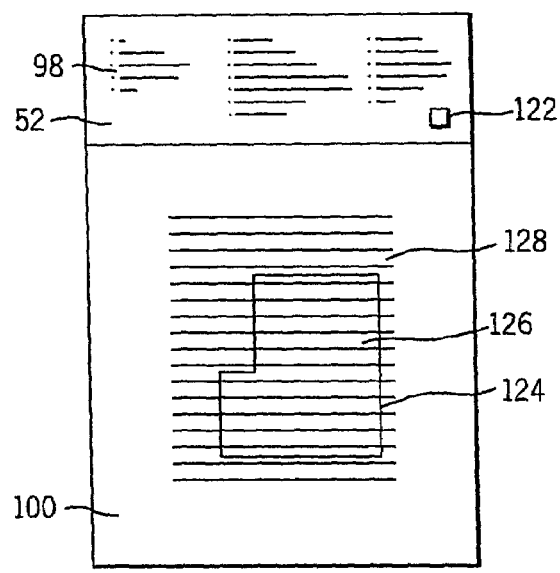
FIG. 10 is a further alternative configuration of a document support, including an instruction set and a designated spatial region surrounded by an outline; and, FIG. 11 is a flow chart illustrating exemplary control logic in composing a form of the type illustrated in the preceding figures, inputting instructions contained graphically on the form, and executing an operation based upon the instruction set.

FIGS. 8, 9 and 10 illustrate presently contemplated configurations of instruction input sheets 52, specifically adapted for selection of desired spatial regions for scanning or processing. In all of the illustrated examples, a single sheet is employed including both the instruction set, as well as the document. It should be noted, however, that the same technique may be employed for document processing in which the document to be scanned is positioned on a subsequent page in a batch with an instruction input sheet of the type described above.

As shown in FIG. 8, spatial regions may be designated having predetermined sizes and locations on document area 100. Such areas may be conveniently nested to provide a range of areas which can be selectively scanned. In a present embodiment, lines defining each nested area are formed on the instruction input sheet and a user may selectively place the document in the center of the sheet and select the appropriate outline that corresponds to the size of the document. The sheet illustrated in FIG. 8 may be accompanied by a transparent overlay page as described above with reference to FIG. 7. In the illustrated embodiment, a series of outlines 112, 114, 116 and 118 are provided on the instruction sheet. In use, each such area would be identified by a corresponding descriptive selection in instruction area 98 which the user can check to select the corresponding area. Thereafter, only the corresponding area is scanned and processed. Alternatively, as described more fully below, the entire width of the page may be scanned and processed, with only a portion of the width being saved in memory, transmitted, and so forth.

FIG. 9 illustrates an alternative configuration for selective spatial scanning in which a series of document areas 120 are disposed in adjacent locations within the document area 100. Again, each spatial location may be designated by a code, and corresponding selectable codes along with descriptive text provided in instruction area 98. It should be noted that one or more of the designated spatial regions may be scanned from document areas such as those shown in FIG. 9. Moreover, such regions may be stored as a single image or as separate images, and processed accordingly. In the alternative configuration illustrated in FIG. 10, a document may be provided within document area 100, and only one or more specific outlined regions of the document are scanned. In the embodiment of FIG. 10, an outline designation 122 may be thus provided in the instruction area 98, and a corresponding outline 124 formed around a desired region of the document. Again, the sheet 52 of FIG. 10 maybe covered by a transparent overlay, permitting an erasable outline 124 to be formed over a document disposed beneath the transparent overlay. In the case of color scanners, outline designation 122 may provide a specific color which is used to form a perimeter or border of the scanned area. Similarly, single color or black-and-white scanners may employ a sufficiently contrasting border to permit selective scanning of the designated area.

For the foregoing spatially selective scanning technique, it should be noted that selected document regions or areas 126 are scanned to the exclusion of adjacent areas 128. In practice, the document support may have an overall scannable width that includes both the desired area 126 and a portion of the extraneous area 128 adjacent to the selected area. For scanners that are configured only for scanning full widths, the entire width of the selected region may be initially scanned, and control circuit 34 or an associated computer system may then pare the encoded data to eliminate adjacent extraneous regions 128. Similarly, the scanner may digitally encode the entire document and store only the selected region 126, paring out data corresponding to the extraneous regions 128 both above, below and to the sides of the selected region. Thus, the technique permits a reduced file size to be handled, stored, transmitted, and otherwise processed for small documents or portions of documents. It should also be noted that the spatially selective scanning technique described herein may be employed to selectively eliminate portions of documents in a similar manner, such as to redact out portions of scanned documents. In such cases, the selected regions, such as region 26 in FIG. 10, may include undesired or redacted material, whereas extraneous regions 128 may include the desired passages or sections.

The foregoing system is preferably implemented via application software which is used to generate or customize the particular instruction sets or selections contained on the instruction input sheet. Such application software may be conveniently stored in memory 48 of computer system 14 and provided with a graphical user interface in a conventional manner. Once the instruction input sheet is composed, the sheet may be stored in memory circuit 48 and printed for subsequent annotation and use. As noted above, a range of such instruction input sheets may be accommodated by the system, inputs on each sheet corresponding to operational parameters of the scanning device, or of the overall system, or to specific selections of a user. Thus, where a user composes specific parameters, such as addresses, identifications, telephone numbers, and so forth (e.g. for destinations of facsimiles) this data is stored in a data set or database either within the computer system or within memory circuit 40 of the scanning device. Thereafter, the data is accessed by the scanning device or by the computer system upon recognition of the instruction input sheet. As noted above, certain specific data, such as telephone numbers, may be included directly on the instruction input sheet.

Figure 11:
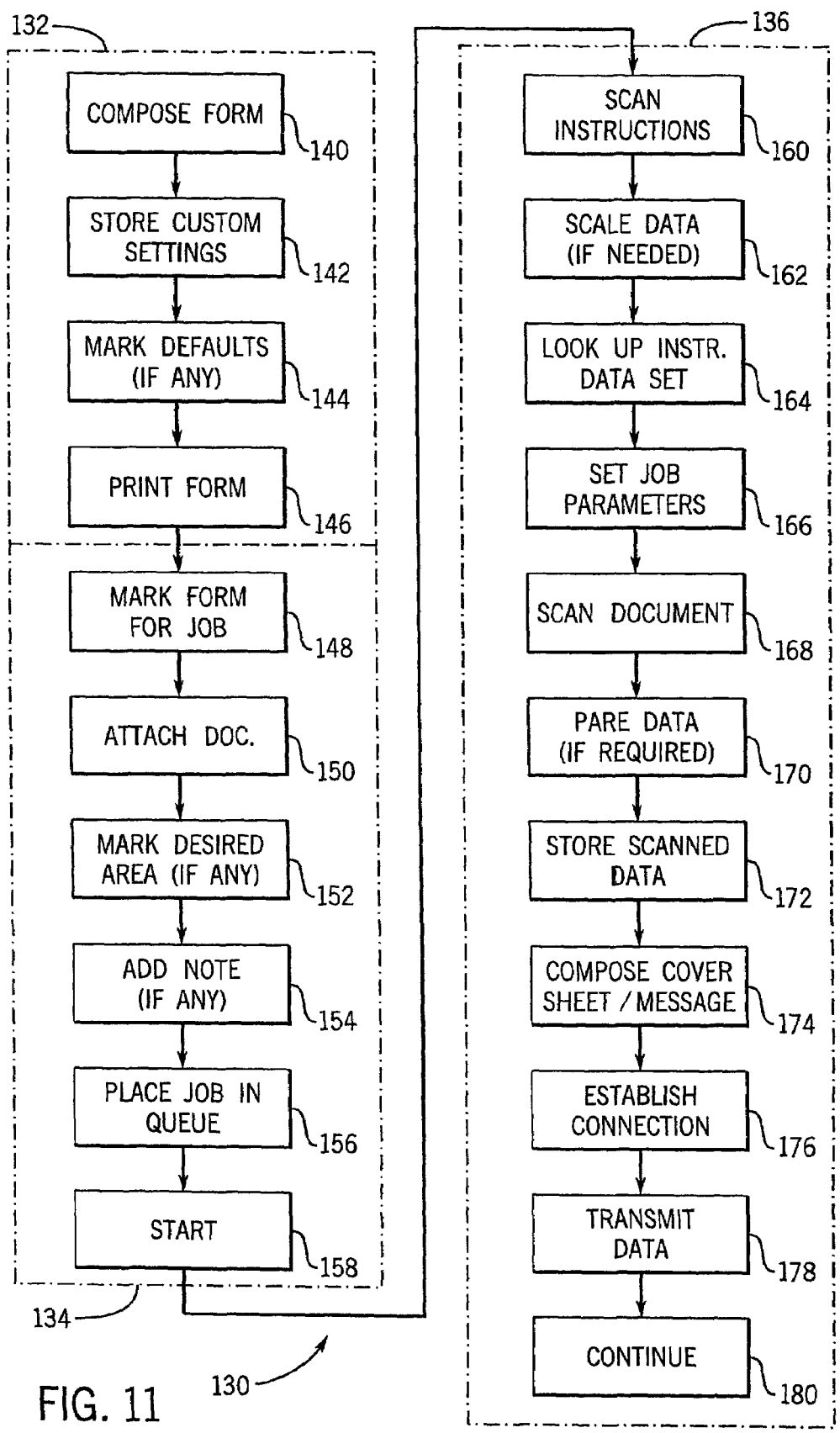

FIG. 11 illustrates exemplary steps in control logic for carrying out the various functions summarized above. This control logic, designated generally by reference numeral 130 in FIG. 11, includes steps for composing or customizing instruction input sheets, as noted as reference numeral 132, steps for preparing and initiating system configurations via the input sheets as noted at reference numeral 134, and steps for processing scanning and other tasks using the input sheets as noted at reference numeral 136.

Referring first to the instruction input sheet preparation steps 132, as noted at step 140, the form or input sheet is first composed via application software. The software may be employed at a computer terminal coupled to the scanning device, or at a remote terminal. As noted above, the composition of the sheet may include standard operational parameters controllable for the scanning device, as well as other parameters including those calling upon applications such as cover page layouts, confirmation form generation, facsimile or electronic message transmission, and so forth. At step 142, customized information corresponding to certain of the instructions on the composed instruction input sheet are stored in memory (or directly on the input sheet). While parameter information for the scanning device may be specified by the scanner manufacturer or driving software, other information on the input sheet may include user-set data, such as destination addresses, and similar information. This information is stored in data sets or databases either within the scanning device or within a computer system linked to the scanning device. As noted above, this information may further include preconfigured forms, such as facsimile cover sheets, confirmation reports, company logos, and so forth. At step 144, any default values applicable for the selectable parameters are marked on the composed input sheet. At step 146 the instruction input sheet is stored and printed for subsequent use. Where desired, the sheet may be simply maintained as a file within the computer system to be later called and completed as needed. Following such completion, the form is printed for scanning.

The job or batch preparation steps 134 begin at step 148 where the instruction input sheet is marked or annotated by the user. By way of example, the user may select facsimile controls, add a hand annotated note to a message block, designate specific recipients of facsimiles or electronic message transmissions, and so forth. At step 150 the desired document (if any) is attached or associated with the instruction input sheet either on the same page as the instructions or on a separate page or pages. At step 152 a desired spatial region of the form is selected, if applicable, as noted above with regard to FIGS. 8, 9 and 10. At step 154 any applicable notes may be added to the form prior to scanning. At step 156 the instruction input sheet and document are inserted into the scanning device and, where the scanning device is equipped to accept a series of jobs in batch fashion, the job is placed in a queue. Finally, at step 158 the operation is launched by simply depressing an appropriate key on the interface panel of the scanning device. The scanning device ends processing upon detection that no further document pages are present. Alternatively, where a series of batch files are stacked in the scanning device, each subsequent job in the series may be independently processed without operator intervention by simply detecting the presence of an additional instruction input sheet. The subsequent job may be initiated automatically or by operator selection of a "start" key, in either case, utilizing the selections on the subsequent instruction sheet.

Following initiation of the processing, the instructions encoded on the instruction input sheet are scanned and the job is processed as indicated by the steps of routine 136. These steps begin at step 160 where the instruction set is scanned and digitized. As noted above, reference locations corresponding to each selectable instruction are identified by contrast with the surrounding areas or the form background. Such contrast may include black-and-white pixel comparisons, gray scale comparisons, or color comparisons. Where desired, the instruction input sheet or the instruction area on a sheet may be scaled by reference to known or anticipated locations of reference or register points on the sheet to properly identify the selected instructions, as indicated at step 162.

Based upon the contrast provided at the referenced locations, control circuit 34, operating independently or in conjunction with CPU 46 or a similar processor, evaluates the digitized data by comparison to instruction data set files stored in memory. Again, such data sets may include parameter settings for the scanning device or the system, as well as user-defined operational parameters. At step 166, the identified parameters are set for use in the scanning or processing routines executed by control circuit 34 or the associated computer system. At step 168 the document associated with the instructions is scanned, employing the parameters set at step 166.

Subsequent to digitizing the information contained in the document, any desired processing, storage or transmission steps may be performed as defined by the user-selected instructions. For example, as indicated at step 170 in FIG. 11, certain data scanned and encoded at step 168 may be pared from the resulting data set. For example, in the case of spatial selections made using forms such as those illustrated in FIGS. 8, 9 and 10, peripheral or extraneous pixel data outside the desired spatial area may be eliminated from the document file. At step 172 the scanned data may be stored for temporary or archival purposes. At step 174, for example, a cover sheet or message may be generated as selected by the user. It should be noted that such operations may call upon additional application software, such as electronic messaging software, document or text editing software, and the like. At step 176, where data transmission is instructed, a connection is established either between the scanning device directly or between an associated networked computer system and a telephone system or a data transfer network. Where such data transmission is desired, at step 178, the data is transmitted in a conventional manner. Following execution of all of the operations desired in the job, the routine terminates at step 180 and continues any subsequent operations.

As indicated above, the logical steps involved in composing, printing and processing the individual information input sheet or form may be considered to be entirely separate from the steps involved in preparing a job to be handled based upon the input sheet. Thus, sample or model forms may be prepared in advance of delivery of a system or scanning device to a user, such as by an original equipment manufacturer or software developer. An application delivered with the product may then prompt the user to input relevant information such as facsimile names, telephone numbers, user defaults, and so forth. The general purpose or specially configured form may then be printed at any convenient time for use in controlling a process involving the scanning function. This printing operation may be performed local to the scanning device, without requiring the user to gain access to a computer system or other device, where desired. Within the process steps described above, various steps may be added or deleted depending upon the type of processing desired. For example, for copy-only uses, the foregoing steps relating to facsimile transmissions would, of course, be unnecessary. Similarly, for scanning operations, documents may be encoded and stored for later retrieval, such as in the form of hard-copies, facsimile copies, reconstituted versions displayed on a computer monitor, and so forth. Moreover, where a simple facsimile message or electronic message is to be transmitted, the information input sheet itself may provide any necessary destination addresses, messages, and the like. The printed indicia on the form which is scanned into the machine for processing may be included in such messages or facsimile transmissions by simple reproduction or by character recognition software, and the like.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for selectively scanning a document under control of a scanning device operably associated with a memory, the method comprising the steps of:

operating the scanning device during a single scanning operation to
(i) automatically sense individual marker areas at predetermined locations in a region on a control sheet, each marker area located near an associated human intelligible representation of a scanning function control parameter,
(ii) respond only to the presence of a marking at one or more of said sensed marker areas and to correlate the sensed presence of a said marking with data stored in said memory corresponding to the scanning function control parameter associated with the marker area having the sensed marking; and
(iii) performing a scanning operation of one or more document areas associated with said control sheet to digitally encode scanned data content thereof in accordance with the scanning function control parameter associated with each respective marker area having a sensed marking; and performing at least a further operation independently of said scanning function control parameters on scan encoded data only from one or more of said document areas occupying less than the total document area scannable during said scanning operation.

2. The method of claim 1, wherein the human intelligible representations include preprinted textual descriptors of said control parameters on the control sheet and during said scanning operation said automatic sensing is not responsive to said preprinted identification textual descriptors.

3. The method of claim 1, wherein said markings comprise user applied markings at one or selected marker areas at said predetermined locations.

4. The method of claim 1, wherein said marker areas comprise closed boundary areas and a marking of a selected marker area is effected by a sensor readable user applied filling or partial filling of said selected area.

5. The method of claim 1, wherein the marker areas are positioned relative to predetermined identifiable reference points on said control sheet.

6. The method of claim 5, wherein the scanning function control parameters include designation of one or more sub-areas of the control sheet each sub-area for receiving at least one document area for encoding contents thereof during said scanning operation in said step (iii).

7. The method of claim 1, wherein said further operation comprises transmitting said scan encoded data over a communications network.

8. The method of claim 1, wherein said further operation comprises storing the scan encoded data in memory.

9. A method for selectively scanning a document under control of a scanning device operably associated with a memory, the method comprising the steps of:
operating the scanning device during a single scanning operation to:
(i) automatically sense individual marker areas at predetermined locations on an instruction region of a control sheet that also includes a document support region, each marker area located near an associated human intelligible representation of a scanning function control parameter,
(ii) respond only to the presence of a marking at one or more of said sensed marker areas and to correlate the sensed presence of a said marking with data stored in said memory corresponding to the scanning function control parameter associated with the marker area having the sensed marking; and
(iii) performing a scanning operation of a document located on the document support region to encode scanned data contents thereof in accordance with the scanning function control parameter associated with each respective marker area of the instruction region at which a sensed marking is present and to store the encoded data in said memory;
wherein one of said scanning function control parameters is scan operability during said scanning operation, and a plurality of marker areas on the instruction region are associated with human intelligible representations of the respective sub-areas of said support region occupying less than the total area of the document support region, whereby scan encoding during said scanning operation is determined by sensing markings associated with at least a selected one of said sub-areas; and
performing at least a further operation on encoded scan data only from each sub-area.

10. The method of claim 9, wherein said scanning device is operable during said scanning operation to encode scanned contents of the document only over at least one of said sub-areas of said support region.

11. The method of claim 9, wherein the sub areas of the support region are identified by border indicia.

12. The method of claim 9, wherein the border indicia comprise a nested set of border indicia.

13. The method of claim 9, wherein during the scanning operation t encoded scan data are generated only by scanning over the or each said sub-area.

14. A method for selectively scanning a document under control of a scanning device operably associated with a memory, the method comprising the steps of:
operating the scanning device during a single scanning operation to
(i) automatically sense individual marker areas at predetermined locations in on a control sheet, each marker area located near an associated human intelligible representation of a control parameter, first ones of said marker areas associated with scan function control parameters and other ones of said marker areas associated with operation control parameters;
(ii) respond to the presence of a marking at one or more of said sensed marker areas and to correlate the sensed presence of a said marking with data stored in said memory corresponding to the control parameter associated with the marker area having the sensed marking; and
(iii) performing a scanning operation of one or more document areas associated with said control sheet to encode scanned data content thereof in accordance with the scanning function control parameter associated with each respective first marker area having a sensed marking; and
in accordance with the operation control parameter associated with each respective other marker area having a sensed marking, performing at least a further operation on scan encoded data only from one or more of said document areas occupying less than the total document area scannable during said scanning operation.

15. The method of claim 14, wherein said operation control parameters include copy function parameters.

16. The method of claim 14, wherein said operation control parameters include facsimile transmission parameters.

17. The method of claim 14, wherein said operation control parameters include sender and recipient identification data.

18. A method for selectively scanning a document under control of a scanning device operably associated with a memory, the method comprising the steps of:
operating the scanning device during a single scanning operation to
(i) automatically sense first and second individual marker areas at predetermined locations in a region on a control sheet, each first marker area located near an associated human intelligible representation of a scanning function control parameter, each second marker area located near an associated human intelligible representation of an operation control parameter different from said scanning function control parameter;
(ii) respond only to the presence of a marking at one or more of said sensed first marker areas and to correlate the sensed presence of a said marking with data stored in said memory corresponding to the scanning function control parameter associated with the first marker area having the sensed marking; and
(iii) performing a scanning operation over a document area associated with said control sheet to encode scanned data content thereof in accordance with the scanning function control parameter associated with the or each respective first marker area having a sensed marking; and
performing at least a further operation independently of said scanning function control parameters on encoded data of only one or more predefined document sub-areas, each sub-area having an area less than said document area, said at least one further operation performed in accordance with an operation control parameter associated with one or more second marker areas having a sensed marking.

19. A system including a scanning device and an operatively associated memory, the system comprising:
a document having a portion to be encoded;
a control sheet including an instruction region and a support region, said instruction region including a plurality of marker areas at predetermined locations of the instruction region, each marker area located near an associated human intelligible representation of a scanning device functional parameter, and a plurality of said marker areas on the instruction region are associated with human intelligible representations of control parameters including marker areas associated with first and second scan function control parameters and further marker areas associated with operation control parameters;
said scanning device operable during a single pass scanning operation over said control sheet to automatically sense and respond to the presence of markings at a plurality of said marker areas in the instruction region of the control sheet by correlating the sensed presence of a said marking with data stored in said memory corresponding to the control parameter associated with the marker area at which the sensed marking is located, and to perform a scanning operation in the document support region of the control sheet;
wherein first scanning function control parameters associated with first marker areas define one or more discrete sub-areas of the support region;
said scanning device operable during said scanning operation of the document support region to generate and store in said memory scanned data signals resulting from scanning data located in the support region, the scanning device operable to encode the scanned data signals in accordance with second scanning function control parameters associated with second ones of said marker areas associated with scan function control parameters at which the presence of a marking is sensed during scanning of said instruction region; and
wherein said system is operable to perform at least one operation under control of an operation control parameter associated with a said further marker area having a sensed marking using stored encoded scan data from one or more discrete sub-areas in the document support region defined by a second scan function control parameter.

20. The system of claim 19, wherein a scanned document is supported on the instruction support.

21. The system of claim 19, wherein the memory is included in the scanning device.

22. The system of claim 19, wherein the scanning device is configured to scan a region larger than each said sub-area and to pare data from a resulting data set to eliminate data corresponding to areas of said support regions outside the or said sub-area.

23. The system of claim 19, wherein each sub-area is also marked by a border.

* * * * *

UNITED STATES PATENT AND TRADEMARK OFFICE
CERTIFICATE OF CORRECTION

PATENT NO. : 7,002,712 B2
APPLICATION NO. : 10/614482
DATED : February 21, 2006
INVENTOR(S) : John C. Barker et al.

It is certified that error appears in the above-identified patent and that said Letters Patent is hereby corrected as shown below:

In column 5, line 47, delete "bard" and insert -- hard --, therefor.

In column 12, lines 56-57, in Claim 1, delete "scan encoded" and insert -- encoded scan --, therefor.

In column 13, line 44, in Claim 9, delete "operability" and insert -- operable --, therefor.

In column 13, line 63, in Claim 13, delete "t" and insert -- to --, therefor.

In column 14, line 61, in Claim 18, delete "the or" before "each".

In column 14, line 64, in Claim 18, after "encoded" insert -- scan --.

In column 15, line 1, in Claim 18, delete "an" and insert -- the --, therefor.

Signed and Sealed this

Twenty-third Day of June, 2009

JOHN DOLL
*Acting Director of the United States Patent and Trademark Office*